Patented Nov. 4, 1947

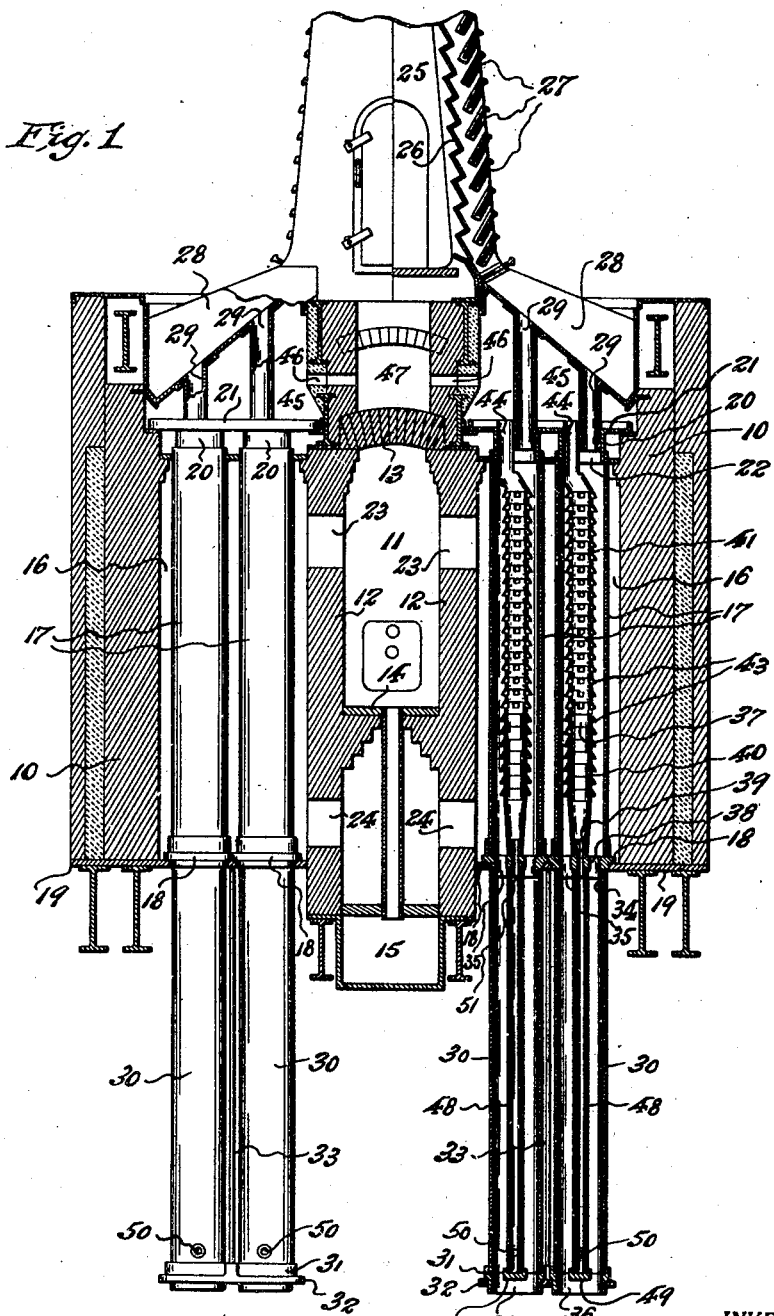

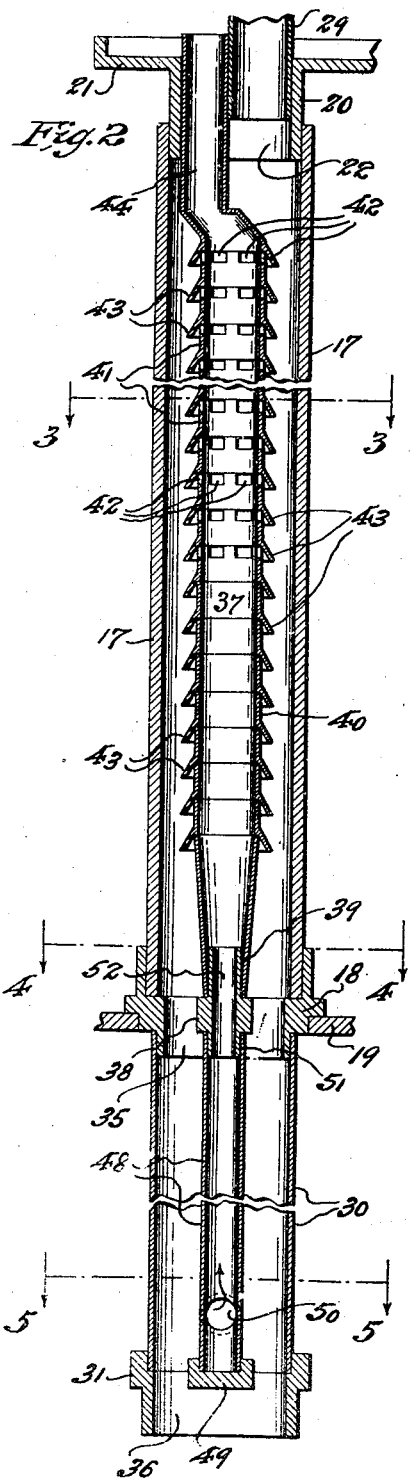
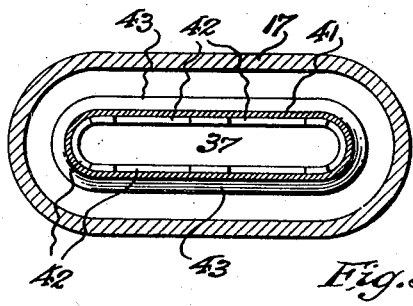
Fig.3
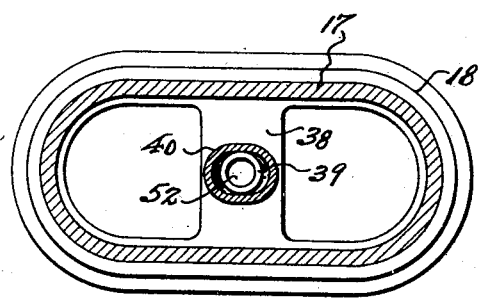
Fig.4
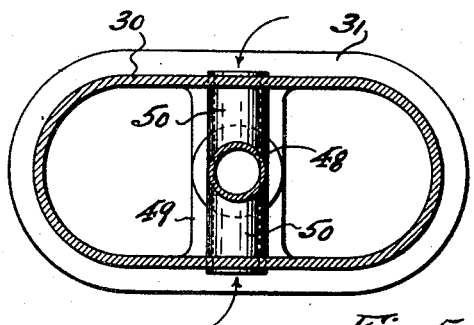
Fig.5

2,430,056

UNITED STATES PATENT OFFICE 2,430,056

CHAR REVIVIFICATION APPARATUS INCLUDING MEANS FOR RECLAIMING AND REUTILIZING HEAT FROM THE COOLING SECTION THEREOF

Robert Sayre Kent, Brooklyn, N. Y.

Application December 16, 1944, Serial No. 568,541

4 Claims. (Cl. 202—120)

This invention relates to improvements in apparatus for revivifying filtrate material, such as char or bone-black, after use thereof for filtering liquors in the process of refining sugar.

It is well known in the sugar refining industry that filtrate material, such as char or bone-black, after the same has been used in filtration operations, may be substantially dried and then revivified and freed from accumulated excess carbon content and other impurities by baking the same in a kiln or retort, whereby the impurities collected in the pores of the char particles are burnt or distilled off, so that the filtering value of the char is brought back to practical efficiency. One type of apparatus commonly employed for such char revivification comprises dryer means, retort means and cooler means so related that the char to be treated may flow by gravitation through the dryer means, thence through the retort means, and finally through the cooler means, being discharged from the latter in the required revivified condition ready for reuse. In such type of apparatus, the dryer means is so constructed as to dispose the char, gravitating therethrough, in a relatively thin layer subject to application of heat thereto for driving off moisture therefrom. The thus dried char is discharged from the dryer for delivery and gravitation through highly heated retort means, which is also provided with means for disposing the char gravitating therethrough in relatively thin mass in contact with the highly heated retort walls, said latter means including means for venting from the retort the vapors and gases liberated from the char by the baking process. The baked char, which leaves the retort means at a high temperature (approximately 800° F.) is caused to gravitate through the cooler means, whereby heat is transferred from the char and its temperature greatly reduced (to approximately 200° F.), so that the revivified char is in suitably cooled condition for delivery to char filters.

This invention has for an object to provide, in char revivifying apparatus of the type above referred to, novel means for reclaiming heat given off by the cooling char which traverses the cooling means, which heat has generally been wasted, and returning said heat to the retort means, whereby to increase the efficiency of the latter, so that speedier flow therethrough of char under treatment may be attained, and consequently so that a greater quantity of char per unit of time may be effectively purified.

Another object of this invention is to provide novel means which, in addition to its heat reclamation effect, also cooperates with the retort means in such manner as to substantially improve and accelerate the discharge of vapors and gases given off by the char undergoing baking treatment in such retort means.

Other objects of this invention, not at this time more particularly enumerated, will be understood from the following detailed description of the same.

An illustrative embodiment of char revivifying apparatus according to this invention is shown in the accompanying drawings, in which:

Fig. 1 is a transverse vertical sectional view of char revivifying apparatus according to this invention, with parts thereof shown in elevation, and with the upper part of the dryer section thereof broken away.

Fig. 2 is a fragmentary vertical longitudinal sectional view of a retort member of the apparatus and the cooler tube connected therewith, said view being drawn on an enlarged scale; and Figs. 3, 4 and 5 are respectively horizontal cross sectional views, taken respectively on lines 3—3, 4—4, and 5—5, in Fig. 2, said views being drawn on a further enlarged scale.

Similar characters of reference are employed in the above described views, to indicate corresponding parts.

Referring to the drawings, the reference character 10 indicates a kiln of well known construction adapted to contain and heat a series of retorts through which char, desired to be revivified by baking, is caused to gravitate. Said kiln is provided with the usual central combustion chamber 11 enclosed by side walls 12, top arch 13 and floor wall 14. Beneath the combustion chamber 11 is located the usual air box 15. On opposite sides of the combustion chamber 11 are located retort chambers 16, through which extend a plurality of suitably supported tubular retorts 17. The lower ends of the retorts 17 are supported by bottom caps 18 which are seated upon the floor 19 of the kiln 10. The upper ends of the retorts 17 are supported by the dependent tubular necks 20 of top or cover plates 21, the latter being suitably supported to close the upper ends of the retort chambers 16; the passages 22 of said necks serve to admit char into and for descent through the retorts. The products or hot gases of combustion generated within the combustion chamber 11 pass into the upper ends of the retort chambers 16 through entrance ports 23 provided in the side walls 12 of said combustion chamber. The products or hot gases of combustion, thus delivered into the retort chambers 16, circulate around the retorts 17 and pass downwardly along the same, being discharged from the retort chambers through exit ports 24, escaping thence through suitable channels to the dryer means presently to be described and thence to a stack (not shown).

Mounted on top of the kiln 10 is a dryer means of the general kind shown in my prior United States Letters Patent #984,931, and 1,962,643. This dryer means is provided with a central chamber 25 through which is suitably passed the gases and products of combustion out going from the kiln, to be thence discharged through the kiln stack (not shown), thus providing heat for preliminary drying of the moist char which is delivered to and passed through the dryer means preparatory to delivery to the retorts 17. The sides of the dryer means are formed by inner zigzag walls 26. Outwardly offset from said zigzag walls 26 are a series of suitably spaced downwardly and inwardly inclined external plates 27, thus forming an intermediate char passage through which moist char may gravitate in a relatively thin layer. The heat applied to this thin layer of char drives off the major part of its moisture content, the resulting vapors escaping to the atmosphere through the open spaces between said external plates 27. The lower discharge ends of the char passages of the dryer means communicate with char receiving hoppers 28, which are located above the upper ends of the kiln retort chambers 16. Extending from said hoppers 28 are feed pipes 29 which enter the upper ends of the kiln retorts 17, whereby the preliminarily dried char discharged from the dryer means may gravitate to and enter said retorts for descent therethrough.

Extending downwardly from the lower discharge ends of the retorts 17 are cooler tubes 30. The lower ends of said cooler tubes are supported by bottom caps 31, which are in turn supported by carrier frames 32. Said carrier frames 32 are suspended by tie-rods 33 dependent from the kiln floor 19. The upper ends of said cooler tubes 30 are supported by tubular necks 34 which project from the undersides of the retort bottom caps 18; the passages 35 of said necks 34 serve to admit char, discharged from the retorts, into and for descent through said cooler tubes 30. The bottom caps 31 which support the lower ends of the cooler tubes are provided with passages 36 through which the revivified and cooled char is discharged to suitable receiving means (not shown), whence it may be taken to filters or like means (not shown), to be there stored until reuse thereof in filtration operations is desired.

Extending through the interior of each retort 17, from bottom to top thereof, is a tubular conduit 37. The lower end of said conduit 37 is supported by a transverse bridge piece 38 which spans the passage of the retort bottom cap 18, being held in position by the engagement thereof over a coupler spout 39 upstanding from said bridge piece. A suitably predetermined extent of the lower portion 40 of said conduit is imperforate, while the upper portion thereof is perforate to provide a vapor collector section 41, whereby gases and vapors given off by the heated char within the retort pass through the perforations or ports 42 into the interior of the collector section 41, so as to be collected therein and vented therefrom. The walls of the conduit 37 are suitably formed to provide external downwardly and outwardly flared annular flanges 43. Those flanges 43 which extend from the collector section 41 of the conduit are disposed to overhang the perforations or ports 42 thereof, so as to guard the latter against access therethrough of char into the interior of said collector section. Said flanges 43 may be continued along the imperforate lower portion 40 of the conduit, so that the flanges are provided along substantially the entire length of the conduit 37, whereby to cause the char gravitating through the retort to flow in relatively thin mass along and in intimate contact with the highly heated retort walls. At its upper end, said conduit 37 terminates in a discharge extension 44, which projects upwardly through the tubular neck 20 of the top or cover plate 21 of the retort, so as to communicate with a chamber 45 disposed intermediate the retort chamber 16 and the char feed hopper 28. Leading from the chamber 45 is a port 46 which communicates with a flue 47 provided in the kiln structure; said flue serving to discharge vapors and gases, emitted from the retorts 17, to the kiln stack.

Extending axially through the interior of each cooler tube 30 is an air induction pipe 48. The lower end of said air induction pipe is supported on a transverse bridge piece 49 which spans the passage 36 of cooler tube bottom cap 31. At its lower end, said air induction pipe 48 is provided with at least one transverse intake member 50 which extends through the cooler tube wall, so that its outer end is open to the atmosphere externally of the cooler tube. The upper end of the air induction pipe 48 is held in position by engagement over a coupler spout 51 dependent from the bridge piece 38 of the retort bottom cap 18, and in alignment with the upstanding coupler spout 39 of the latter. Said spouts 39 and 51 provide a connecting passage 52 between the air induction pipe 48 and the conduit 37 of the retort 17 which is above the cooler tube through which said air induction pipe extends.

In operation, char that has been used and wetted in filtration operations is first passed through the dryer means, whereby its moisture content is driven off. From the dryer means, the char, which ordinarily still contains from 6 to 12 per cent moisture, is delivered into the tops of the retorts 17 for gravitation therethrough, and so as to be subjected to the revivifying effect of high heat, usually approximately 800° F. At 400° F., the volatile carbon compounds contained in the char are vaporized so as to be capable of being vented therefrom, while at 800° F., foreign fixed carbon is reduced to ash and gas. The char treated in a retort 17, discharges from the lower end thereof at a temperature of about 800° F., and must be cooled down to about 200° F. The cooling of the char is effected during descent thereof through a cooler tube 30, whereby heat is ordinarily transferred from the char entirely through the cooler tube walls to the ambient atmosphere. Heat thus dissipated is usually wasted, although some attempt has been made to return it by circuitous route to the dryer means in aid of the preliminary char drying operation performed in the latter, but no effective means has heretofore been provided for reclaiming such heat in aid of the char baking operation performed in a retort. The instant invention however provides means for reclaiming heat transferred from the char traversing a cooler tube, and thereupon returning such heat to the retort in aid of the char baking operation carried on in the latter. Such reclamation is effected as follows:

Atmospheric air enters the intake means 50 at the bottom end of an air induction pipe 48, so as to rise through the latter. Since said air induction pipe 48 is surrounded by the hot char in the cooler tube 30, through which said pipe 48 extends, heat will be transferred from said char to the column of air ascending said pipe 48, thus charging said air with thermal units. The thus heated air is delivered from the pipe 48 into the conduit 37 within the retort 17 above, thereby heating the walls of said conduit, and especially the lower imperforate section 40 of said conduit, and consequently aiding application of heat to the char undergoing treatment in said retort. The lower section 40 of the conduit 37 being imperforate, will permit no ingoing air to escape into the surrounding char, which char attains maximum temperature in the lower end portion of the retort, and consequently no risk of combustion and destruction of active carbon of the char, which is desired to be conserved, occurs. The air thus delivered into the lower end of the conduit 37, in ascending therethrough, flows onward through the perforate vapor collector section 41 of said conduit, and is finally discharged from the upper end of the latter to pass thence to the flue 47, and to the kiln stack with which the latter communicates. The natural draft thus provided, maintains flow of air into and through the air induction pipe 48 and thence through the conduit 37. The movement of air through the perforate vapor collector section 41 assists materially in drawing into the latter the vapors and gases liberated from the char content of the retort, whereby removal and carrying away of said vapors and gases from the char is greatly accelerated, which also contributes to the efficiency of the char baking operation. All of these factors contribute to increase the efficiency of the char revivifying treatment, so that speedier flow of char through the apparatus may be permitted, and consequently a greater quantity of char per unit of time may be effectively purified.

It will be understood that the particular type of retort kiln shown in the drawings and hereinabove described has been so shown and described merely by way of illustration and not by way of limitation, since the invention may be applied to any other specific design or type of retort kiln which is equipped with cooler pipes to receive char from its retorts.

Having now described my invention, I claim:

1. In a kiln for the purposes described, a retort member and a cooler tube coupled in end to end vertically disposed and communicating relation, an air induction pipe extending axially through the interior of said cooler tube in direct contact with the hot char descending the latter, said pipe having air intake means open to the atmosphere exteriorly of said cooler tube, a conduit extending axially through said retort member, said conduit having a lower imperforate section and an upper perforate section, said perforate section providing means to collect and vent vapors and gases liberated from the char under treatment in said retort member, and means to couple said pipe and conduit in end to end communicating relation, whereby heat from char descending said cooler tube from said retort member may be transferred through the walls of said pipe to the air ascending therein and thereby returned to char in said retort member by transfer through the walls of said conduit primarily by conduction through the lower imperforate section of the latter.

2. In a kiln for the purposes described, a retort member and a cooler tube coupled in end to end vertically disposed and communicating relation, an air induction pipe extending axially through the interior of said cooler tube in direct contact with the hot char descending the latter, said pipe having air intake means open to the atmosphere exteriorly of the lower end of said cooler tube, a conduit extending axially through said retort member, said conduit having a lower imperforate section and an upper perforate section, said perforate section providing means to collect and vent vapors and gases liberated from the char under treatment in said retort member, means to couple said pipe and conduit in end to end communicating relation, whereby heat from char descending said cooler tube from said retort member may be transferred through the walls of said pipe to the air ascending therein and thereby returned to char in said retort member by transfer through the walls of said conduit primarily by conduction through the lower imperforate section of the latter, and means to discharge air and collect vapors and gases from the perforate upper end of said conduit with draft effect induced by said air flow.

3. In a kiln for the purposes described as defined in claim 1, wherein said conduit is provided with longitudinally spaced external outwardly and downwardly flaring annular flanges, certain of said flanges guarding the openings of the perforate section of said conduit against access by the char within the retort member, and said flanges in their entirety being adapted to cause the char gravitating through the retort member to flow in relatively thin mass along and in intimate contact with the retort member walls.

4. In a kiln for the purposes described as defined in claim 2, wherein said conduit is provided with longitudinally spaced external outwardly and downwardly flaring annular flanges, certain of said flanges guarding the openings of the perforate section of said conduit against access by the char within the retort member, and said flanges in their entirety being adapted to cause the char gravitating through the retort member to flow in relatively thin mass along and in intimate contact with the retort member walls.

ROBERT SAYRE KENT.

REFERENCES CITED

The following references are of record in the file of this patent:

UNITED STATES PATENTS

| Number | Name | Date |
| --- | --- | --- |
| 293,430 | Eastwick | Feb. 12, 1884 |
| 303,378 | Matthiessen | Aug. 12, 1884 |
| 308,476 | Eastwick | Nov. 25, 1884 |
| 592,547 | Krause | Oct. 26, 1897 |
| 1,418,970 | Pool | June 6, 1922 |
| 1,704,093 | Marshall | Mar. 5, 1929 |

FOREIGN PATENTS

| Number | Country | Date |
| --- | --- | --- |
| 203,908 | Switzerland | 1939 |